E. SACHS.
FREE WHEELING AND BACK PEDALING GEAR.
APPLICATION FILED MAR. 28, 1911.

1,014,181.

Patented Jan. 9, 1912.

Witnesses.
Joseph C. Stack.
J. Austin Stone

Inventor.
Ernst Sachs
By Julian C. Dowell
his attorney

UNITED STATES PATENT OFFICE.

ERNST SACHS, OF SCHWEINFURT, GERMANY.

FREE-WHEELING AND BACK-PEDALING GEAR.

1,014,181.  Specification of Letters Patent.  Patented Jan. 9, 1912.

Application filed March 28, 1911. Serial No. 617,375.

*To all whom it may concern:*

Be it known that I, ERNST SACHS, a subject of the King of Bavaria, residing at No. 23 Schultesstrasse, Schweinfurt, in Germany, have invented new and useful Improvements in Free-Wheeling and Back-Pedaling Gears, of which the following is a specification.

This invention relates to a driving and free-wheeling gear and a separate braking gear, which two mechanisms are capable of combined operation, and adapted to be fixed on the periphery of the rear hub of a cycle in place of the usual sprocket rim and its counter-ring by means of the right- and left-hand threads provided on the hub for that purpose.

The object of the invention is the special construction and connection of the two devices with one another in such a manner that they individually comprise separate but entire appliances operative with respect to their respective purposes, and that when fixed on the hub engage one another by a part common to both appliances, and which is devised for transmitting the power from the driving mechanism to the brake on the one hand, while controlling the driving gear under the influence of stationary parts of the brake on the other hand. This object is attained by means of the guiding ring and spacer of a roller clutch device forming the driving means, and by the arrangement of the brake expanding mechanism on the periphery of the said guiding ring in which inclined pockets or surfaces are made being the rising ways and bearing surfaces of rollers adapted to expand a brake ring, when rotating in one direction. The said brake ring which is fixed to the cycle frame encircles the brake applying device thereby separating the same from the rotating parts connected with the cycle-hub.

A constructional form of the appliance is illustrated by way of example in the annexed drawing, which forms a part of this specification, and in which—

Figure 1:
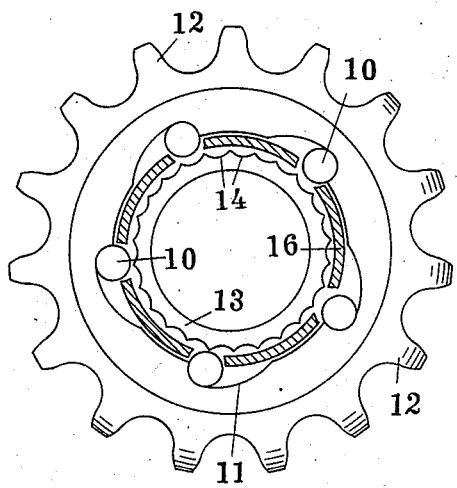
Figure 3:
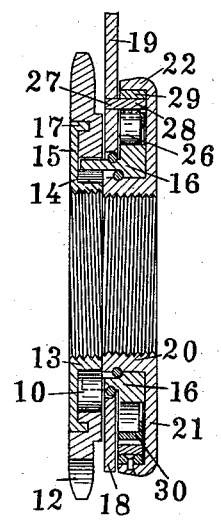
Figure 2:
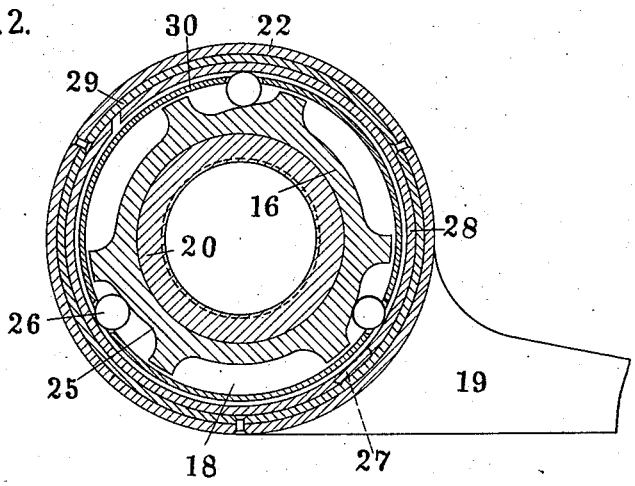

Figure 1 is an elevation of the inner side of the sprocket rim and of the driving clutch, the guide ring of the latter being shown in section, Fig. 2 is a vertical section of the brake mechanism, and Fig. 3 is a transverse section through the whole appliance.

Like numerals denote like parts throughout all figures of the drawing.

The free-wheel and driving coupling consists of a number of clutch rollers 10 mounted in inclined pockets 11 of the inner periphery of the sprocket ring 12. The said rollers, when the sprocket ring is rotated forward, owing to the shape of the pockets, act upon the periphery of a ring 13, which is to be attached by a right-handed screw thread upon the hub in the place of the sprocket wheel, being forced against the smooth surface of the said ring 13, or by engaging with recesses 14 thereof. The base ring 13, on the side facing toward the spoke flange, has a flange 15 which serves as a lateral guide and support for the sprocket ring 12 and the rollers 10, and which has an annular rib 17 on its periphery engaging in an annular groove of the sprocket ring 12 securely guiding the latter. The rollers 10 of the driving clutch are controlled by a spacer and guide ring 16 fitted between the sprocket ring 12 and the ring 13, the rollers being held at convenient distances from one another in recesses provided in the said guide ring.

The brake mechanism is arranged on a ring 20 having left-handed screw threads and being rigidly connected with a disk 21 on the circumference of which there is a flange 22 directed toward the sprocket ring 12. Between the ring 12 and the brake is interposed a disk 18 adapted to be connected with the rear fork by an arm 19 so as to be prevented from rotation. These parts constitute a casing in which the brake is inclosed and protected against damage and dust. The brake itself consists of an expanding device constituted by any convenient number of rollers 26 located in inclined pockets 25 on the periphery of the guide ring 16, and a brake ring 28 which is split and held against rotation by a stud or shoulder 27 engaging the disk 18, and which ring is expanded on backward motion of the movable parts by the said rollers 26, when the brake is to be applied, thus being forced against the inner periphery of the flange 22 or against a lining 29 of brass or other suitable braking material fixed to this part by rivets or other connecting means, as will be seen in Fig. 2 that shows the braking position of the device. In order to cause the brake ring to be at all points forced outward equally, the brake-expanding rollers 26 are loosely held in the recesses of a guide ring 30 that spaces the same at convenient distances from one another.

The mechanism operates as follows: On forward rotation of the sprocket ring 12 by the driver, the guide ring 16 being slightly retarded by the friction existing in the mechanism, the rollers 10 will be removed to the shallower parts of the pockets 11 and consequently pressed inward into the recesses 14 of the ring 13, thereby coupling the sprocket ring with the ring 13 screwed onto the hub, so that forward driving of the cycle is effected. If the pedals, and with them the sprocket ring 12, are held without movement, the driving clutch device is automatically released as the ring 13 turning with the wheel of the cycle, carries the rollers 10 to the deeper parts of the pockets 11, whereupon they leave the recesses 14. This is the free-wheeling position of the mechanism. On wheeling the cycle backward the driving coupling is held out of operation by the friction of the guide ring 16 in the stationary disk 18, so that the brake cannot inadvertently be applied. When the sprocket ring 12 is rotated backward by the driver, the guide ring 16 is firmly connected to the sprocket ring by means of the rollers 10 bearing against the ends of the pockets 11, as illustrated by Fig. 1, so that the said guide ring will also be turned backward. By this movement the expanding rollers 26 are forced outward on the inclined planes of the pockets 25, so that they apply the brake ring 28 against the inner periphery of casing 22 rotating with the hub, while the brake ring owing to its connection with the disk 18, stands still and brakes the rear wheel.

In this particular construction the rotating parts of the expanding means are disposed inside the brake ring, which renders the control of the same independent of the movement of the hub, while the driving coupling is indirectly checked by stationary parts of the brake.

I have described a constructional form of the combined free-wheel mechanism and braking device, but obviously the details thereof may be varied without departing from the subject matter of the invention.

Therefore, what I broadly claim as my invention, and desire to secure by Letters-Patent, is—

1. In a free-wheel and brake mechanism, the combination with driving means, of a coupling adapted to be operated by said driving means in one direction of rotation and to be released in the other direction, a member engaging the coupling and provided with external pockets at one end, a stationary brake member arranged around said coupling-engaging member, and rolling members disposed in the pockets of the coupling-engaging member and arranged to be carried thereby against the brake member.

2. A free-wheel mechanism having driving mechanism including a roller clutch and a guide ring engaging the same and provided with peripheral pockets having inclined bottoms, in combination with a back pedaling brake comprising a flange rotatable with the driving mechanism, a non-rotatable split brake ring adapted to bear against said flange, and rollers bearing against said brake ring and located in the peripheral pockets of the guide ring.

3. In a free-wheel and brake mechanism, the combination with a free-wheel roller clutch, of a guide ring engaging the same and provided with peripheral pockets, a brake member, a stationary split ring coöperating with said brake member, and rollers located in the peripheral pockets of the guide ring and bearing against said split ring to expand the same against the brake member.

4. In a free-wheel gear and brake mechanism, the combination with a driving mechanism, a roller clutch adapted to connect the same to a hub, and a guide ring engaging said clutch and provided with peripheral pockets, of a brake mechanism comprising a rim, a split brake ring encircled by said rim, rollers arranged in the peripheral pockets of the guide ring to bear against and expand the split brake ring, and a stationary disk member interposed between the driving and braking mechanisms and to which the split brake ring is fixedly secured.

In testimony whereof I have signed my name to this specification in the presence of two subscribing witnesses.

ERNST SACHS.

Witnesses:
EMIL KOLFHAUS,
JEAN GRUND.